(12) United States Patent
Wang et al.

(10) Patent No.: US 10,611,363 B2
(45) Date of Patent: Apr. 7, 2020

(54) METHODS AND SYSTEM FOR OPERATING A VARIABLE VOLTAGE CONTROLLER

(71) Applicant: Ford Global Technologies, LLC, Dearborn, MI (US)

(72) Inventors: Jiyao Wang, Canton, MI (US); Felicia Sun, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/782,235

(22) Filed: Oct. 12, 2017

(65) Prior Publication Data

US 2019/0111911 A1   Apr. 18, 2019

(51) Int. Cl.
*B60W 20/14* (2016.01)
*B60L 50/15* (2019.01)
(Continued)

(52) U.S. Cl.
CPC ............. *B60W 20/14* (2016.01); *B60L 50/15* (2019.02); *B60W 10/08* (2013.01);
(Continued)

(58) Field of Classification Search
CPC ............ H02M 7/00; H02M 7/66; H02M 7/68; H02M 7/72; H02M 7/79; H02M 7/797; H02M 7/42; H02M 7/48; H02M 7/53; H02M 7/537; H02M 7/5387; H02M 7/53871; H02M 7/53873; H02M 7/02; H02M 7/04; H02M 7/21; H02M 7/217; H02M 7/219; H02M 7/5395; H02M 1/32; H02M 1/36; H02M 3/158; H02M 2001/0067; H02M 2001/007; H02M 2001/0048; H02M 2001/0054; H02M 2001/0058; H02M 2001/0012; H02M 2001/0009; H02M 1/38; B60W 20/00; B60W 20/10; B60W 20/13; B60W 20/14; B60W 10/02; B60W 30/18; B60W 30/18127; B60W 2510/08; B60W 2510/18; B60W 2510/083; B60W 10/04; B60W 10/08; B60L 11/02; B60L 11/04; B60L 11/10; B60L 11/12; B60L 11/1814; B60L 11/00; B60L 11/123; B60L 11/126; B60L 2210/00; B60L 2210/40; B60L 2210/42; B60L 2210/30; B60L 2210/10; B60L 2210/12; B60L 2210/14; B60L 50/00; B60L 50/10; B60L 50/14; B60L 50/15

USPC ..... 363/15–17, 19, 21.02, 21.03, 34, 35, 37, 363/40–43, 50, 55–56.02, 78, 79, 95–99, 363/106, 109, 123–127, 131–134;
(Continued)

(56) References Cited

U.S. PATENT DOCUMENTS

9,123,467 B2   9/2015   Wu et al.
2003/0107352 A1   6/2003   Downer et al.
(Continued)

*Primary Examiner* — Alex Torres-Rivera
*Assistant Examiner* — Carlos O Rivera-Perez
(74) *Attorney, Agent, or Firm* — David Kelley; McCoy Russell LLP (57) ABSTRACT

Systems and methods for operating an inverter that is electrically coupled to a battery and an electric machine that provides propulsive force to vehicle are described. The systems and methods may selectively adjust a duty cycle of an inverter transistor responsive to battery voltage and a dead time between when a first transistor is deactivated and when a second transistor is activated.

11 Claims, 6 Drawing Sheets

(51) Int. Cl.
*H02M 3/158* (2006.01)
*H02M 7/797* (2006.01)
*B60W 10/08* (2006.01)
*B60W 30/18* (2012.01)
*H02M 1/38* (2007.01)
*H02M 1/00* (2006.01)

(52) U.S. Cl.
CPC ...... *B60W 30/18127* (2013.01); *H02M 3/158* (2013.01); *H02M 7/797* (2013.01); *B60L 2210/42* (2013.01); *B60W 2510/083* (2013.01); *B60W 2510/18* (2013.01); *H02M 1/38* (2013.01); *H02M 2001/007* (2013.01)

(58) Field of Classification Search
USPC ........... 323/205–211, 259, 266, 271–277, 323/282–286, 299–303, 351; 701/22, 701/29.1–29.9; 180/65.28–65.31; 318/151, 599, 800–803, 400.3, 722
See application file for complete search history.

(56) References Cited

U.S. PATENT DOCUMENTS

| | | | |
|---|---|---|---|
| 2004/0165868 A1* | 8/2004 | Sato | B60L 11/1803 |
| | | | 388/804 |
| 2007/0165432 A1* | 7/2007 | Okamura | H02M 5/4585 |
| | | | 363/132 |
| 2010/0131136 A1* | 5/2010 | Ichikawa | B60L 11/00 |
| | | | 701/22 |
| 2011/0170318 A1 | 7/2011 | Chen | |
| 2012/0242309 A1* | 9/2012 | Korzeniowski | H02M 3/158 |
| | | | 323/282 |
| 2018/0175776 A1* | 6/2018 | Tsujii | B60L 15/007 |

\* cited by examiner

METHODS AND SYSTEM FOR OPERATING A VARIABLE VOLTAGE CONTROLLER

FIELD

The present description relates to methods and a system for operating a variable voltage control inverter of an electric only vehicle or a hybrid vehicle. The methods and systems may be particularly useful for vehicles that adjust boost voltage or buck voltage to provide a desired propulsion motor torque or to provide regeneration capability.

BACKGROUND AND SUMMARY

A vehicle may include an electric machine to provide propulsive torque to accelerate the vehicle. The electric machine may also provide a braking torque to the vehicle whereby the vehicle's kinetic energy may be converted into electric energy and stored for subsequent use. The electric machine may be electrically coupled to a battery or other electric energy storage device via an inverter. The inverter may convert direct current (DC) from the battery into alternating current (AC) to power the electric machine. Alternatively, the inverter may convert alternating current into direct current to charge the battery. The inverter may include a buck circuit and a boost circuit to increase battery voltage or decrease electric machine voltage. For example, when the inverter operates in a boost mode, battery voltage may be increased via storing electric energy in a magnetic field of an inductor and then discharging the inductor to the electric machine. The voltage developed across the inductor plus the battery voltage results in an output voltage that is greater than battery voltage. However, if the voltage output from the battery and the inductor is above or below a desired voltage where the electric machine operates efficiently, electrical power use by the electric machine may be less efficient than is desired.

The inventors herein have recognized the above-mentioned issues and have developed a variable voltage control inverter operating method, comprising: receiving data to a controller; and switching a transistor of the variable voltage control inverter at a duty cycle via the controller in response to a desired output voltage of the variable voltage control inverter not being less than a battery voltage, the duty cycle adjusted responsive to the battery voltage.

By switching a transistor of a variable voltage control inverter at a duty cycle that is responsive to battery voltage when a desired output voltage of the variable voltage control inverter is not less than battery voltage, it may be possible to provide the technical result of improving electrical system efficiency. In particular, efficiency of an electric machine may be improved. Further, if the inverter is operated on a buck mode, battery charging efficiency may be improved by precisely controlling battery charging voltage.

The present description may provide several advantages. In particular, the approach may reduce over boosting when battery charge is low. Further, the approach may increase battery voltage boost capability by allowing the inverter to boost to higher voltages. In addition, the approach may be applied while operating the inverter in buck or boost modes.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
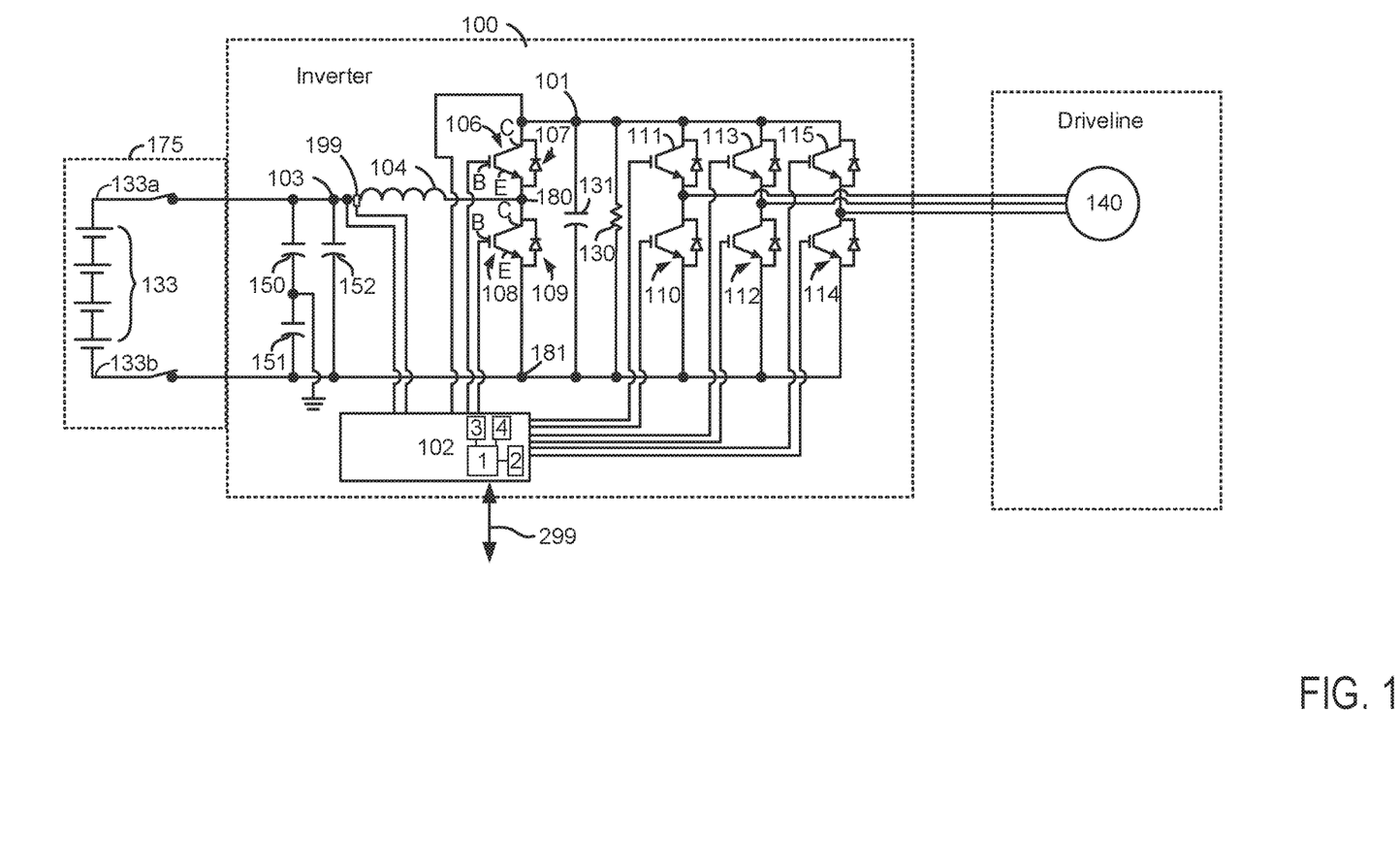
FIG. 1 is a schematic diagram of an inverter.
Figure 2:
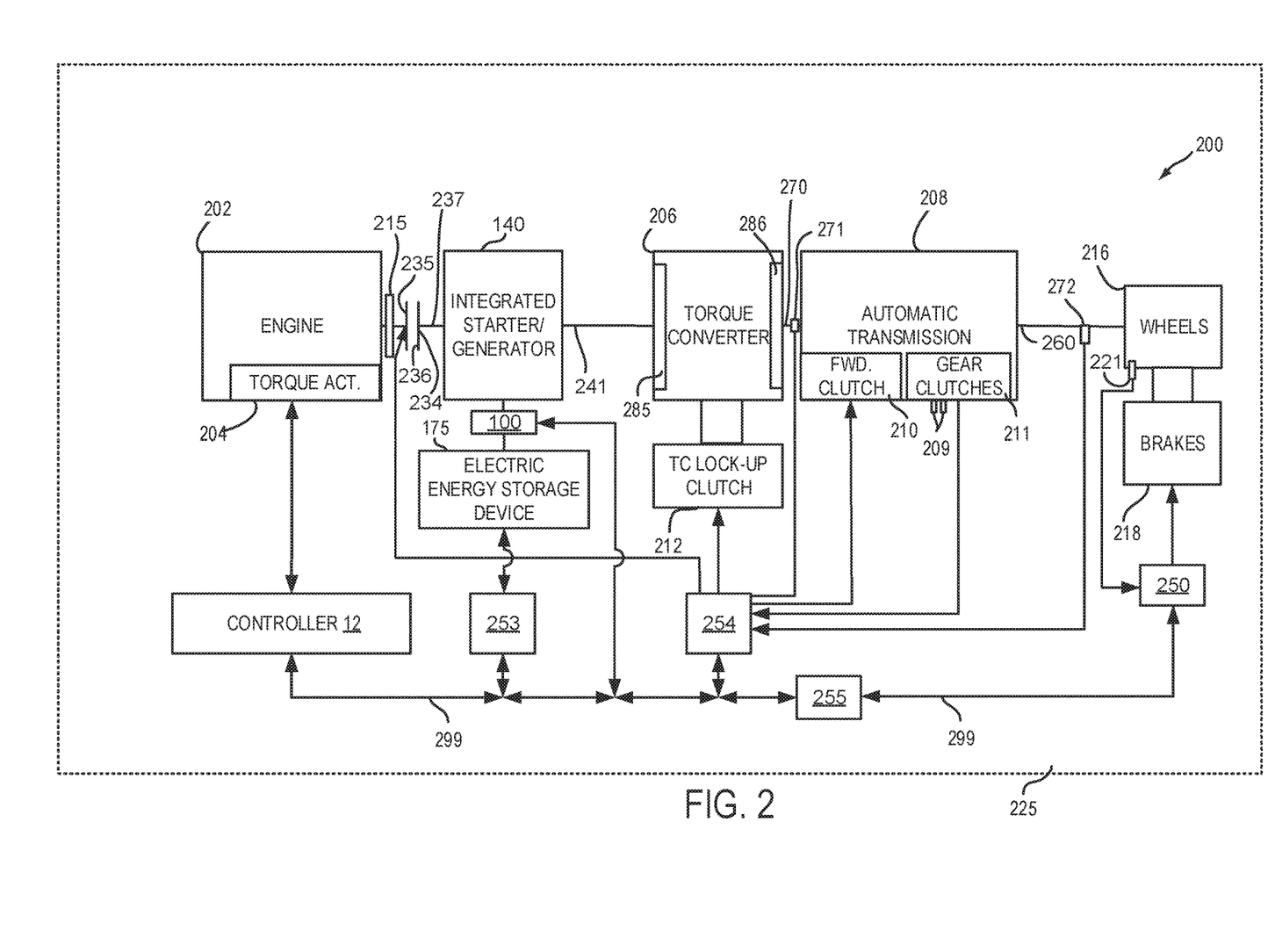
FIG. 2 is a schematic diagram of a hybrid vehicle system.
Figure 3:
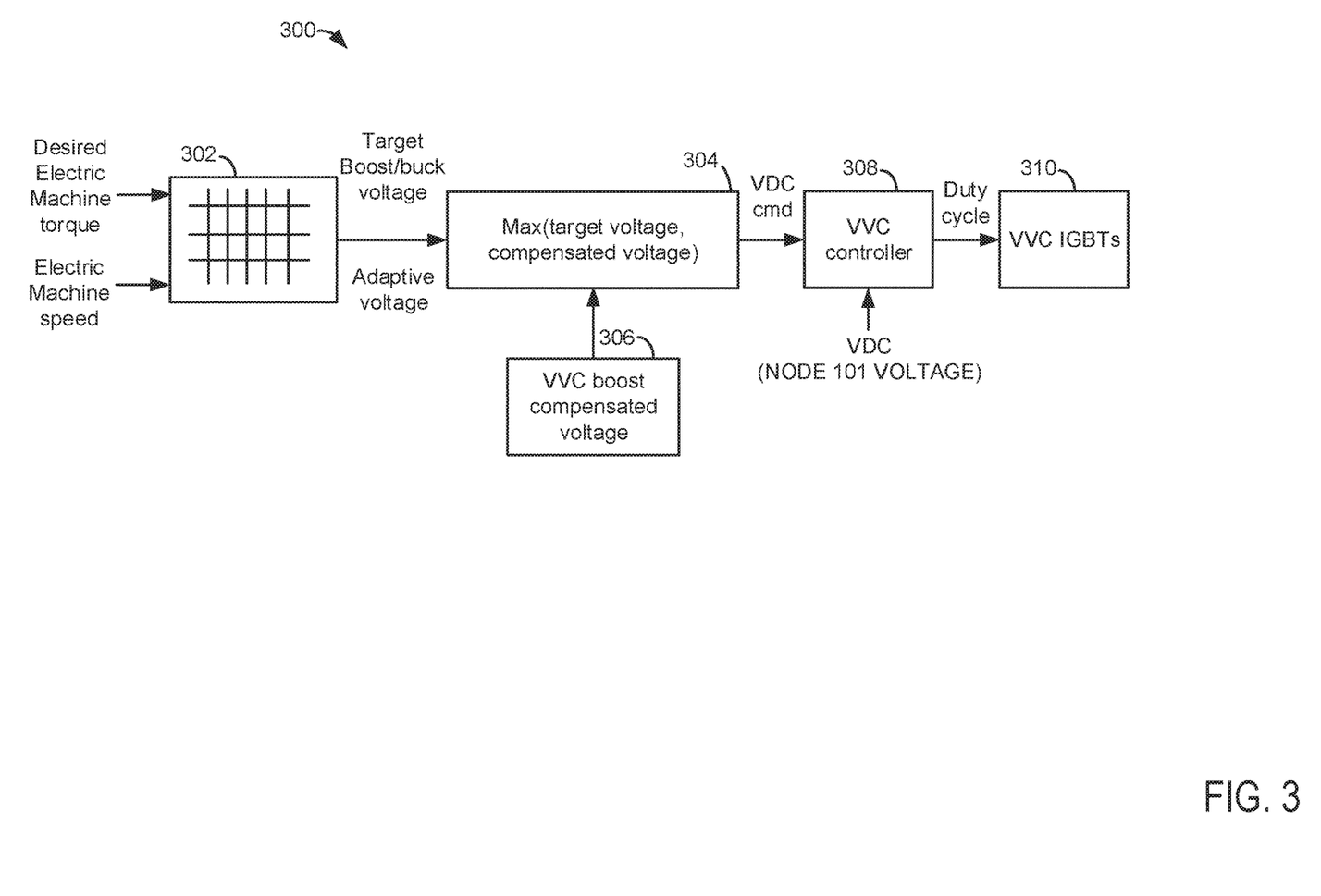
FIG. 3 shows an example control block diagram for compensating inverter buck or boost voltage.
Figure 4:
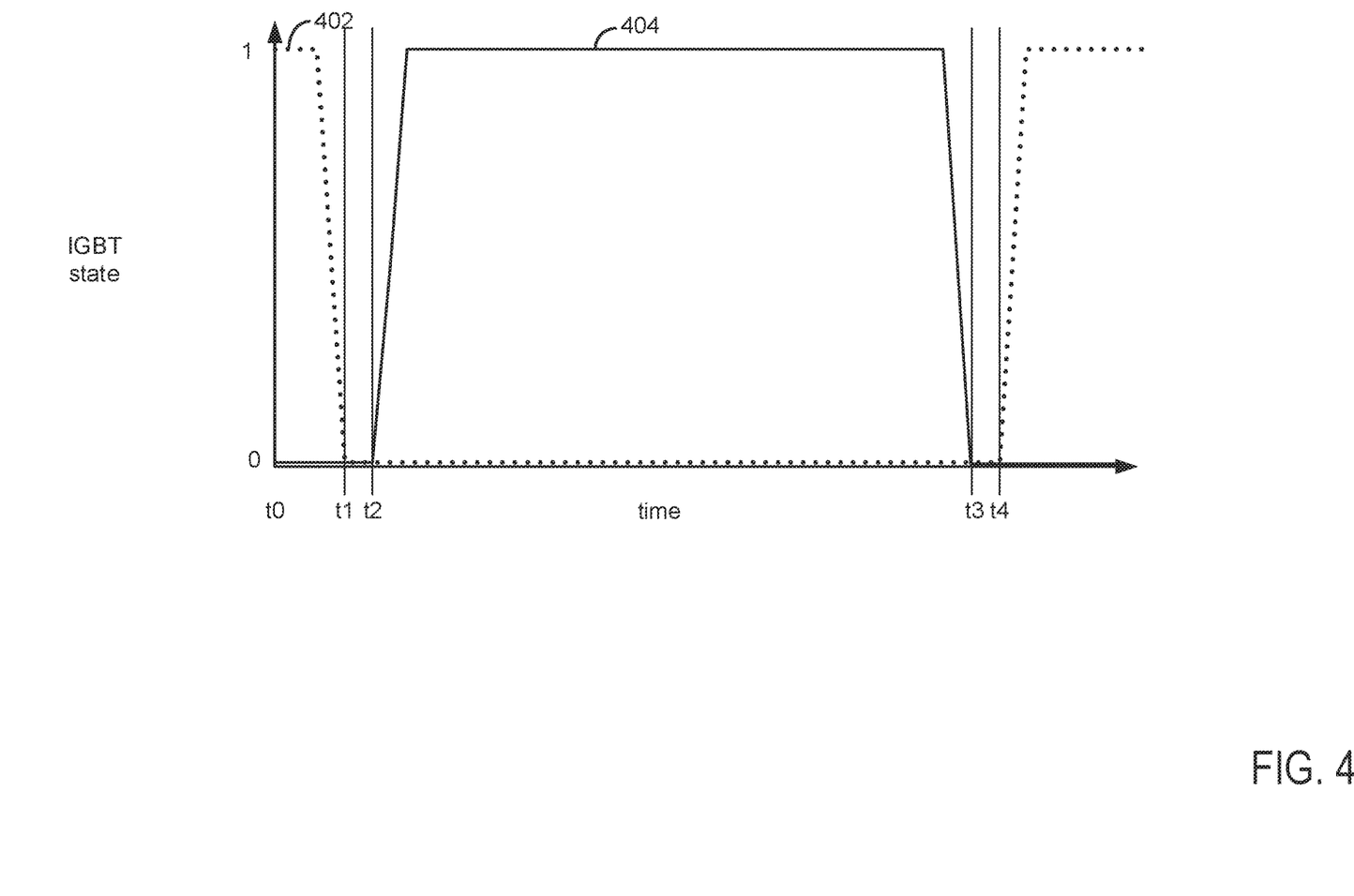
FIG. 4 shows an example dead time between boost transistor deactivation and buck transistor activation.

The present description is related to operating a variable voltage control inverter of a vehicle that includes an electric machine to provide effort to propel the vehicle and effort to decelerate the vehicle. The inverter may be configured as shown in FIG. 1. The inverter may be included in a vehicle driveline as shown in FIG. 2. The inverter may be operated via a controller as shown in FIG. 3. Voltage output of the inverter may be adjusted responsive to a dead time between boost transistor deactivation and buck transistor activation or a dead time between buck transistor deactivation and boost transistor activation as shown in FIG. 4. The inverter may be operated in a boost mode according to the method of FIG. 5 and the inverter may be operated in a buck mode according to the method of FIG. 6.

Referring to FIG. 1, inverter 100 is shown electrically coupled to electric energy storage device 175 (e.g., battery). In this example, electric energy storage device includes a plurality of battery cells that are connected in series to increase a voltage of electric energy device 175. Inverter 100 is also shown being electrically coupled to electric machine 140 (e.g., a three phase electric machine that may be operated as a motor or alternator). Inverter 100 includes a controller 102 that may communicate with vehicle system controller 255 shown in FIG. 2 via controller area network (CAN) 299. Controller 102 is electrically coupled to bases of transistors 106, 108, and 110-115. Controller 102 may supply control signals to independently activate and deactivate transistors 106, 108, and 110-115. Controller 102 includes inputs and outputs 2 (e.g., digital inputs, digital outputs, analog inputs, analog outputs), non-transitory memory 3 (e.g., read only or electrically erasable memory), and transitory memory 4. Controller 102 may sense voltage at node 103 and current flow through inductor 104 via current sensor 199.

Transistors 106, 108, and 110-115 are shown as insulated gate bipolar transistors (IGBT), but in alternative configurations, they may be metal oxide field effect transistors (MOSFETs), field effect transistors (FETs), or other known types of transistors. Controller 102 may activate IGBTs via supplying a higher potential voltage to gates of transistors 106, 108, and 110-115. Controller 102 may deactivate IGBTs via supplying a lower potential voltage to gates of transistors 106, 108, and 110-115. Gates of transistors 106 and 108 are indicted by the letters "G." Collectors of transistors 106 and 108 are indicated by letters "C." Emitters of transistors 106 and 108 are indicated by letters "E." Transistors 110-115 have similar bases, emitters, and collectors as indicated for transistors 106 and 108. Transistors 106 and 108 also include diodes 107 and 109, which are forward biased between the respective emitters and collectors. Current may flow between the collectors and the emitters of transistors 106 and 108 when they are activated. Current flow between the collectors and emitters of transistors 106 and 108 is prevented when transistors 106 and 108 are deactivated. Transistors 110-115 operate similarly. Transistors 110-115 may be selectively activated and deactivated to convert DC to AC.

Inductor 104 is shown directly electrically coupled to transistors 106 and 108. Inductor 104 is also directly electrically coupled to capacitor 150, capacitor 152, and electric energy storage device 175. Capacitor 151 is shown electrically coupled to capacitor 150 and a negative side of electric energy storage device 175.

In a boost mode, controller 102 may selectively activate transistor 108, which may be referred to as a boost transistor, to charge inductor 104 via charge provided by electric energy storage device 175 from positive terminal 133a. Inductor 104 impedes current flow as it begins to store electric energy in a magnetic field. The polarity of the left hand side of inductor 104 is positive when boost transistor 108 is closed. Current flow through inductor 104 is reduced and its magnetic field begins to collapse when boost transistor 108 is opened. The polarity of inductor 104 changes so that the right side of inductor 104 has the positive polarity as its collapsing magnetic field supports continuing current flow to the load. The voltage of electric energy storage device 175 and the voltage developed across inductor 104 are connected in series, thereby providing the voltage of electric energy storage device 175 plus the voltage of inductor 104 at node 180. The voltage at node 180 less a small voltage drop across diode 107 develops at node 101, which is the output of the variable voltage control inverter boost circuit and input to transistors 110-115 when VVC is operating in a boost mode, since diode 107 is forward biased. Charge may be stored in capacitor 131 to smooth the output voltage of the boost circuit at node 101. The voltage at node 101 is a DC voltage. The variable voltage control inverter boost circuit may include capacitors 150-152, inductor 104, boost transistor 108, diode 109, diode 107, capacitor 131, and resistor 130. The voltage at node 101 is supplied to transistors 110-115 which switch on and off to provide three phase AC power to electric machine 140. Buck transistor 106 is commanded deactivated whenever boost transistor 108 is commanded activated so as to prevent short circuiting between node 101 and node 181.

If only a small amount of power is requested of electric machine 140, battery voltage minus small voltage drops for inductor 104 and diode 107 may be supplied at node 101 by deactivating buck transistor 106 and boost transistor 108.

In a buck mode, charge is supplied to inductor 104 via electric machine 140. In particular, three phase AC output of electric machine is converted into a DC voltage at node 101 via switching of transistors 110-115 by controller 102. Inductor 104 is charged via activating transistor 106, which may be referred to as a buck transistor. Inductor 104 impedes current flow as it begins to store electric energy in a magnetic field. The polarity of the right hand side of inductor 104 is positive when buck transistor 106 is closed. Current flow through inductor 104 is reduced and its magnetic field begins to collapse when buck transistor 106 is opened. The polarity of inductor 104 changes so that the left side of inductor 104 has the positive polarity as its collapsing magnetic field supports continuing current flow to the load (e.g., electric energy storage device 175). The amount of time inductor 104 is allowed to charge is controlled so that voltage that develops across inductor 104 is less than voltage output via the electric machine 140. Diode 109 couples the right side of inductor 104 to node 181, which is coupled to negative battery terminal 133b. The voltage developed across inductor 104 is connected to positive terminal 133a of electric energy storage device 175. Charge flows from inductor 104 to terminal 133a so that the electric energy storage device may charge. The voltage at node 103 is controlled via adjusting the amount of time buck transistor 106 is activated (e.g., closed to allow current flow through the transistor). Boost transistor 108 is deactivated (e.g., opened to inhibit current flow through the transistor) whenever buck transistor 106 is activated. Charge may be stored in capacitors 150-152 to smooth the output voltage of the buck circuit at node 103. The voltage at node 103 is a DC voltage. The variable voltage control inverter buck circuit may include capacitors 150-152, inductor 104, buck transistor 106, diode 109, capacitor 131, and resistor 130. Voltage and node 103 is the output voltage of the variable voltage control inverter buck circuit. Controller 102 may monitor voltages at nodes 103 and 101. Further, controller 102 may adjust the duty cycle of signals supplied to boost transistor 108 and buck transistor 106 responsive to voltages at nodes 103 and 101.

FIG. 2 is a block diagram of a vehicle 225 including a powertrain or driveline 200. The powertrain of FIG. 2 includes engine 202. Powertrain 200 is shown including vehicle system controller 255, engine controller 12, inverter 100 (shown in FIG. 1), transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 102 included in inverter 100, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 102 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 102, transmission controller 254, and brake controller 250. Alternatively, the vehicle system controller 255 and the engine controller 12 may be a single unit while the electric machine controller 102, the transmission controller 254, and the brake controller 250 are stand-alone controllers.

In this example, powertrain 200 may be powered by engine 202 and electric machine 140. In other examples, engine 202 may be omitted. Engine 202 may be started via electric machine 140 (e.g., an integrated starter/generator or a motor/generator). Further, torque of engine 202 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to electric machine input shaft 237.

Electric machine 140 may be operated to provide torque to powertrain 200 or to convert powertrain torque into electrical energy to be stored in electric energy storage device 175 in a regeneration mode. Electric machine 140 is in electrical communication with energy storage device 175. Electric machine 140 directly drives powertrain 200 or is directly driven by powertrain 200. In other examples, electric machine 140 may be included in a power split hybrid vehicle or electric machine 140 may be the sole source of propulsive effort. There are no belts, gears, or chains to couple electric machine 140 to powertrain 200. Rather, electric machine 140 rotates at the same rate as powertrain 200. Electrical energy storage device 175 (e.g., high voltage battery or power source) may be a battery, capacitor, or inductor. The downstream side of electric machine 140 is mechanically coupled to the impeller 285 of torque converter 206 via shaft 241. The upstream side of the electric machine 140 is mechanically coupled to the disconnect clutch 236. Electric machine 140 may provide a positive torque or a negative torque to powertrain 200 via operating as a motor or generator as instructed by electric machine controller 102 shown in FIG. 1.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the electric machine. Vehicle system controller 255 requests the engine torque from engine controller 12 and the electric machine torque from electric machine controller 102. If the electric machine torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 175, a charging torque (e.g., a negative electric machine torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the electric machine 140 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. Electric machine 140 supplies a negative torque to transmission input shaft 270, but negative torque provided by electric machine 140 may be limited by transmission controller 254 which outputs a transmission input shaft negative torque limit (e.g., not to be exceeded threshold value). Further, negative torque of electric machine 140 may be limited (e.g., constrained to less than a threshold negative threshold torque) based on operating conditions of electric energy storage device 175, by vehicle system controller 255, or electric machine controller 102. Any portion of desired negative wheel torque that may not be provided by electric machine 140 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 202, transmission 208, electric machine 140, and brakes 218 provided via engine controller 12, electric machine controller 102, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 102 may control torque output and electrical energy production from electric machine 140 by adjusting current flowing to and from armature windings of electric as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor (not shown) directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative electric machine torque does not cause the wheel torque limit to be exceeded. For example, if controller 250 issues a negative wheel torque limit of 50 N-m, electric machine torque is adjusted to provide less than 50 N-m (e.g., 49 N-m) of negative torque at the wheels, including accounting for transmission gearing.

Thus, the system of FIGS. 1 and 2 provides for a system, comprising: an inverter including a boost transistor, a buck transistor, and a controller, the controller including executable instructions stored in non-transitory memory to adjust a duty cycle applied to the boost transistor or the buck transistor via the controller in response to a desired output voltage of the variable voltage control inverter not being less than a battery voltage, the duty cycle adjusted responsive to the battery voltage. The system further comprises a battery electrically coupled to the inverter and an electric machine electrically coupled to the inverter. The system further comprises additional instructions to adjust the duty cycle in further response to a dead time between the boost transistor being activated and a buck transistor being deactivated. The system further comprises additional instructions to command the buck transistor to activate and the boost transistor to deactivate at a substantially same time. The system further comprises additional instructions to switch the boost transistor at the duty cycle via the controller in response to a desired output voltage of the variable voltage control inverter being less than a battery voltage and the desired output voltage of the variable voltage control inverter being greater than the battery voltage minus a threshold voltage. The system includes where the desired output voltage is a voltage at a collector of the boost transistor.

Figure 5:
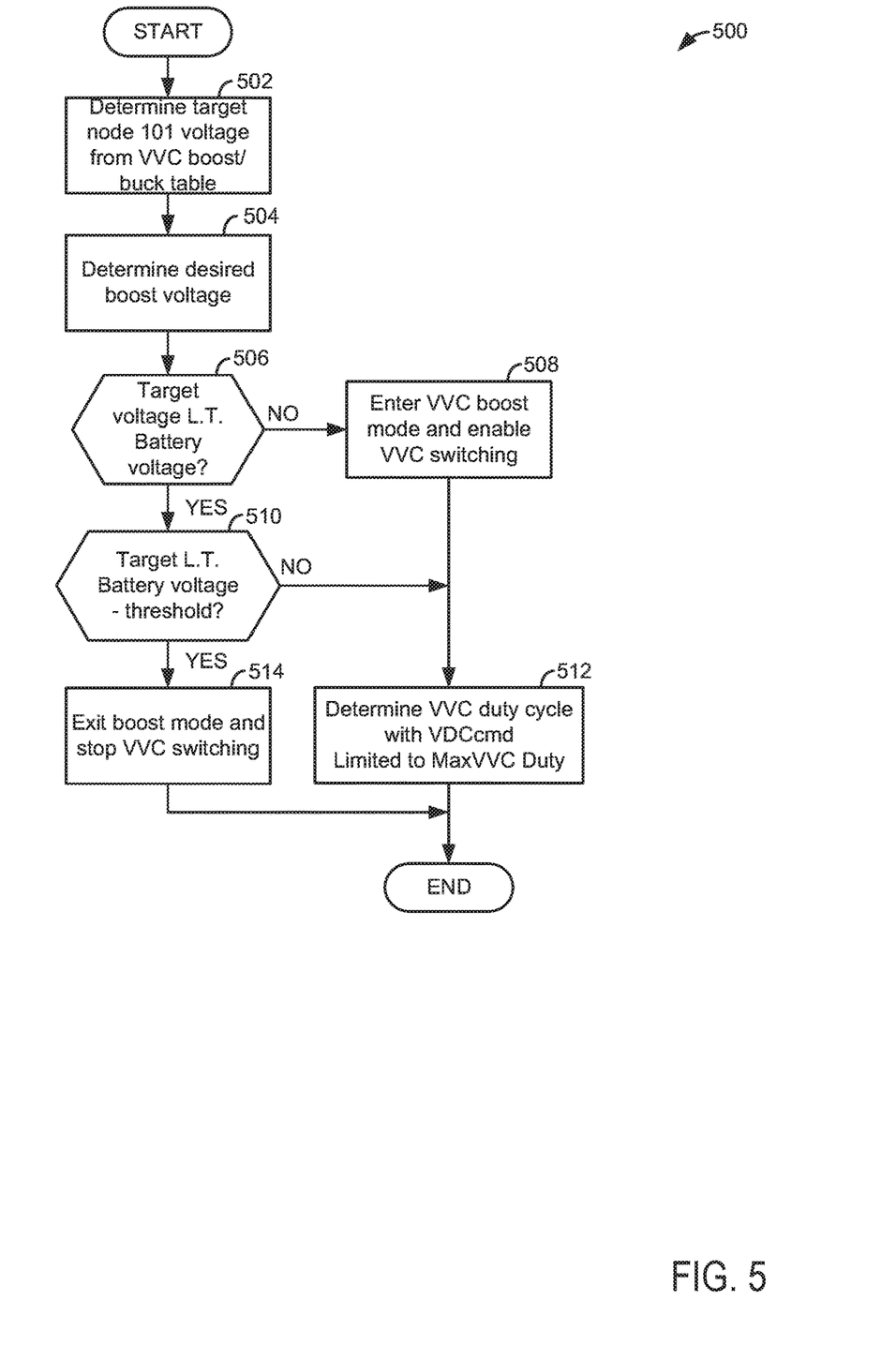
FIG. 5 shows a flow chart of a method for operating the inverter in a boost mode.
Figure 6:
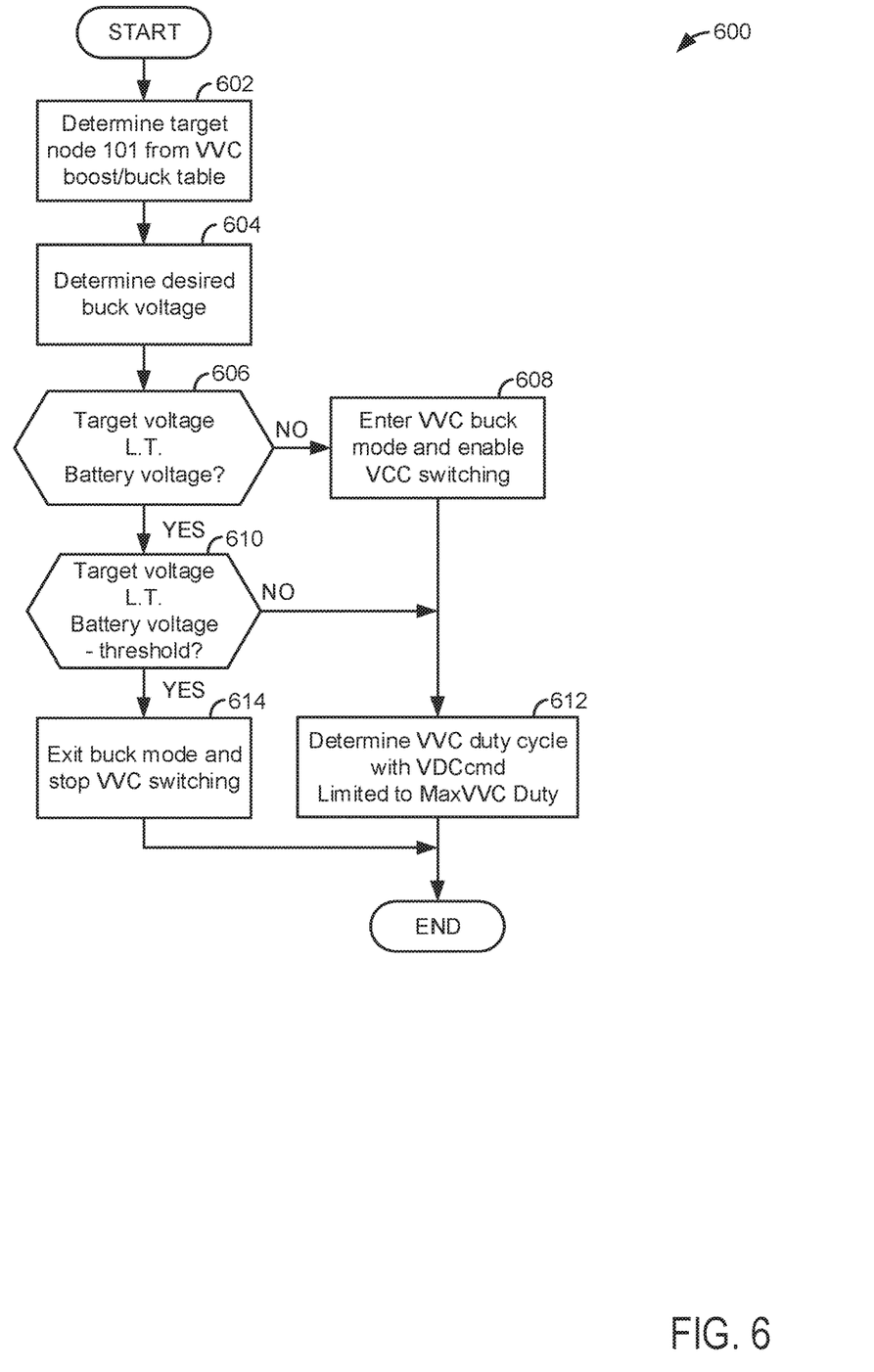
FIG. 6 shows a flow chart of a method for operating the inverter in a buck mode.

Referring now to FIG. 3, a block diagram of a controller that may be incorporated into the method of FIGS. 5 and 6 is shown. Further, the variable voltage controller (VVC) 300 of FIG. 3 may be incorporated into the system of FIGS. 1 and 2.

An electric machine torque request and present electric machine speed are input to variable voltage control boost/buck table 302. The variable voltage control boost/buck table 302 may output target boot voltages (Target_V) when the electric machine torque request amounts are signed positive. The boost voltages are voltages at node 101 of FIG. 1. The variable voltage control boost/buck table 302 may output target buck voltages when the electric machine torque request amounts that are signed negative. The buck voltages are voltages at node 103 of FIG. 1. The target boost or buck voltage is input to block 304.

VVC compensated buck or boost voltage is determined at block 306 via the following equations:

$$\text{Max\_duty\_cycle} = \frac{\text{Switch\_period} - (2 \cdot \text{deadtime})}{\text{Switch\_period}} \quad \text{Equation (1)}$$

$$\text{VVC\_comp\_voltage} = \frac{\text{Vbatt}}{\text{Max\_duty\_cycle}} \quad \text{Equation (2)}$$

where Max_duty_cycle is a maximum duty cycle of a control signal (e.g., signal supplied to the base of the transistor) supplied to the buck transistor when the variable voltage controller is operating in a buck mode, Max_duty_cycle is a maximum duty cycle of a control signal supplied to the boost transistor when the VVC is operating in a boost mode, Switch_period is a period of the control signal supplied to the buck transistor when the VVC is operating in a buck mode, Switch_period is a period of the control signal when the VVC is operating in a boost mode, dead time is the dead time between boost transistor deactivation and buck transistor activation or between bucktransistor deactivation and boost transistor activation, VVC_comp_voltage is the VVC compensation voltage, and Vbatt is battery voltage or voltage of the electric energy storage device. The VVC may operate in a boost mode when the electric machine torque request amounts that are signed positive. The VVC may operate in a buck mode when the electric machine torque request amounts are signed negative. The VVC compensated buck or boost voltage is input to block 304.

At block 304, VVC 300 selects a maximum value from the VVC compensated buck or boost voltage and the target voltage. The operation of block 304 may be expressed via the following equation:

$$Vdc\_cmd = max(Target\_V, VVC\_comp\_voltage) \qquad \text{Equation (3)}$$

where Vdc_cmd is the commanded voltage at node 101 of FIG. 1 during buck mode and during boost mode, max is a function that returns the greater value of argument 1 (Target_V) and argument 2 (VVC_comp_voltage), and Target_V is the target voltage determined at 302. Block 304 outputs the commanded voltage to VVC controller at block 308.

Block 308 may be a proportional/integral/derivative (PID) controller or other known type of controller that receives the commanded voltage and close-loop feedback adjusts a duty cycle of the signal supplied to the buck transistor or the boost transistor. In one example, voltage at node 101 is subtracted from the commanded voltage Vdc_cmd to provide a voltage error and the duty cycle of the signal supplied to the boost transistor is adjusted responsive to the voltage error in a boost mode. In another example, voltage at node 103 is controlled via controller 102 in response to the voltage at node 101 during buck mode. In particular, the voltage at node 101 is related to the voltage at node 103 via the following equation:

$$V_{103} \cdot I_{i104} = V_{101} \cdot I_L$$

where $V_{103}$ is the voltage at node 103 or at the battery which may also be referred to as $V_{batt}$, $I_{i104}$ is current flow through inductor 104, $V_{101}$ is voltage at node 101 which may be referred to as $V_{dc\_cmd}$, and $I_L$ is current of the load (e.g., electric machine 140. The load current $I_L$ is a function of electric machine speed and torque, which are determined from the desired vehicle braking torque. Controller 102 then adjusts switching of transistor 106 responsive to $I_{i104}$, $V_{101}$, and $I_L$ to provide the desired voltage at node 103 ($V_{103}$) during buck mode. VVC controller 308 supplies a duty cycle control signal to buck transistor 106 or to boost transistor 108.

Referring now to FIG. 4, a plot showing a dead time between when a boost transistor is activated and a buck transistor is deactivated is shown. As previously mentioned, a boost transistor may be commanded activated a predetermined amount of time (e.g., a dead time) after a buck transistor is commanded deactivated or the buck transistor may be commanded activated a predetermined amount of time (e.g., a dead time) after the boost transistor is commanded deactivated to reduce the possibility of shorting between nodes 101 and 181. The dead time compensates for the additional time it takes for an activated transistor to deactivate as compared to the shorter amount of time it takes to activate a deactivated transistor. As such, to reduce a possibility of a short circuit between node 101 in FIG. 1 and node 181 in FIG. 1, a dead time may be instituted to reduce the possibility of short circuiting between the boost transistor 108 and the buck transistor 106. The dead time allows current flow through the transistor that is being deactivated to cease before current flow through the transistor being activated begins.

In this example, dotted line 402 represents operating state of the boost transistor 108 and solid line 404 represents operating state of the buck transistor 106. The buck and boost transistors are deactivated and do not allow current flow through the transistors when traces 402 and 404 are at a lower level near the horizontal axis. The buck and boost transistors are activated and allow current to flow through the transistors when traces 402 and 404 are at higher levels near the value one located along the vertical axis.

At time t0, the boost transistor is activated and the buck transistor is deactivated. Between time t0 and time t1, the boost transistor is commanded deactivated. The buck transistor is commanded activated after a predetermined dead time (at time t2) elapses to prevent simultaneous activation of the buck and boost transistors. The boost transistor is actually deactivated at time t1 and the buck transistor is commanded activated a short time later at time t2. The time between time t1 and time t2 is the dead time and it reduces the possibility of short circuiting between node 101 and node 181 in FIG. 1.

The buck transistor remains activated and the boost transistor is deactivated until just before time t3 when the buck transistor is commanded deactivated. At time t3, the buck transistor is actually deactivated. At time t4, the boost transistor is commanded activated. Thus, the transistor that is being deactivated changes state before the other transistor is activated. In this way, it may be possible to reduce the possibility of short circuiting between node 101 and node 181 of FIG. 1.

Referring now to FIG. 5, a method for operating a VVC in a boost mode is shown. The method of FIG. 5 may be included as executable instructions stored in non-transitory memory of the system of FIGS. 1 and 2. In addition, the methods of FIGS. 5 and 6 may work in cooperation with the system of FIGS. 1 and 2 to receive data and adjust actuators to control the system of FIGS. 1 and 2 in the physical or real world. The method of FIG. 5 controls operation of the VVC.

At 502, method 500 determines a target VVC boost voltage (Target_V) to be present at node 101 of FIG. 1. In one example, the target voltage is a function of an electric machine torque request amount (e.g., 100 Newton-meters) and electric machine speed (e.g., 2000 RPM). The target voltages may be empirically determined and stored into a table that is referenced via the electric machine torque request and the electric machine speed. In one example, the values in the table are boost voltages that provide the highest electric machine efficiency at the present electric machine speed and electric machine torque request amount. The values may be determined via operating the electric machine at various input voltages and determining electric machine efficiency at the different boost voltages for the present electric machine speed and electric machine torque request amount. Method 500 proceeds to 504.

At 504, method 500 determines a desired boost voltage for the VVC. In one example, the desired boost voltage is determined by selecting the maximum of two values. The two values are the target voltage (Target_V) determined at 502 and a value that is equal to battery voltage divided by maximum duty cycle (Max_duty_cycle as determined via equation 1) of the control signal supplied to the boost transistor. This operation is described at 304 of FIG. 3. Method 500 proceeds to 506.

At 506, method 500 judges if the desired voltage determined at 504 is less than (L.T.) voltage of battery or electric energy storage device 175. If so, the answer is yes and method 500 proceeds to 510. Otherwise, the answer is no and method 500 proceeds to 508. If the desired voltage is less than battery voltage, then battery voltage is boosted via the VCC to improve electric machine efficiency when the electric machine is operating as a motor and propelling the vehicle.

At 508, method 500 enters VCC boost mode and begins switching the boost transistor on and off (e.g., activated and deactivated) to boost battery voltage. The buck transistor is also commanded off each time the boost transistor is commanded on or activated. The boost transistor is switched at a predetermined frequency that is based on VVC hardware (e.g., the VVC inductor). Method 500 proceeds to 512.

At 512, method 500 determines the VVC duty cycle and limits the VVC duty cycle so that the dead time is compensated and provided between deactivating the boost transistor and activating the buck transistor or deactivating the buck transistor and activating the boost transistor. In one example, the VVC duty cycle is determined via the following equation:

$$\text{VVC\_duty} = \frac{Vbatt}{Vdc\_cmd} \qquad \text{Equation (4)}$$

where VVC_duty is the VVC duty cycle of the signal supplied to the base of the boost transistor, Vdc_cmd is the desired boost voltage determined at 504, and Vbatt is voltage of the battery or electric energy storage device 175. Further, the value of VVC_duty may be held to a value less than a threshold MaxVVCDuty. The value of MaxVVCDuty may be a predetermined amount smaller than the value of Max_duty_cycle. For example, if Max_duty_cycle is 0.9 then, MaxVVCDuty may be 0.88. The threshold MaxVVCDuty ensures that the maximum duty cycle of the signal applied to the boost does not exceed Max_duty_cycle. Method 500 applies a signal with a duty cycle equal to the limited value of VVC_duty to the boost transistor to control the boost voltage at node 101 of FIG. 1. Further, the VVC and/or inverter applies the boost voltage at node 101 of FIG. 1 to the electric machine after converting it to AC power via switching transistors 110-115 of FIG. 1. The electric machine propels the vehicle. Method 500 proceeds to exit.

At 510, method 500 judges if the target voltage (Target_V) is less than battery voltage (Vbatt) minus a threshold voltage (e.g., 10 volts). The threshold voltage provides hysteresis between a battery voltage at which battery voltage is boosted and provided to the electric machine and battery voltage where battery voltage is not boosted and provided to the electric machine. If method 500 judges that the target voltage (Target_V) is less than battery voltage minus the threshold voltage, the answer is yes and method 500 proceeds to 514. Otherwise, the answer is no and method 500 proceeds to 512.

At 514, method 500 exits boost mode and ceases sending a switching signal to the boost transistor. However, battery voltage may continue to be supplied to the electric machine as long as the sign of the electric machine torque request amount is positive. Method 500 proceeds to exit.

Thus, method 500 may transition between a boost mode where battery voltage is increased via a boosting circuit and supplied to an electric machine and a mode where battery voltage is supplied to the electric machine without boosting. Further, when the battery voltage is boosted, it may be boosted responsive to the battery voltage.

Referring now to FIG. 6, a method for operating a VVC in a buck mode is shown. The method of FIG. 6 may be included as executable instructions stored in non-transitory memory of the system of FIGS. 1 and 2. In addition, the methods of FIGS. 5 and 6 may work in cooperation with the system of FIGS. 1 and 2 to receive data and adjust actuators to control the system of FIGS. 1 and 2 in the physical or real world. The method of FIG. 6 controls operation of the VVC.

At 602, method 600 determines a target VVC voltage (Target_V) to be present at node 101 of FIG. 1. In one example, the target voltage is a function of an electric machine torque request amount (e.g., −100 Newton-meters) and electric machine speed (e.g., 2000 RPM). The target voltages may be empirically determined and stored into a table that is referenced via the electric machine torque request and the electric machine speed. In one example, the values in the table target voltages that provide the highest electric machine efficiency at the present electric machine speed and electric machine torque request amount. The values may be determined via operating the electric machine as an alternator at various input power levels and determining electric machine efficiency at the different target voltages for the present electric machine speed and electric machine torque request amount. Method 600 proceeds to 604.

At 604, method 600 determines a desired buck voltage for the VVC. In one example, the desired buck voltage is determined by selecting the maximum of two values. The two values are the target voltage (Target_V) determined at 602 and a value that is equal to battery voltage divided by maximum duty cycle of the control signal supplied to the buck transistor. This operation is described at 304 of FIG. 3. Method 600 proceeds to 606.

At 606, method 600 judges if the target voltage determined at 602 is less than (L.T.) voltage of battery or electric energy storage device 175. If so, the answer is yes and method 600 proceeds to 610. Otherwise, the answer is no and method 600 proceeds to 608. If the target voltage is less than battery voltage, then battery voltage is bucked or reduced via the VCC to improve battery charging efficiency and electric machine efficiency when the electric machine is operating as an alternator and braking the vehicle.

At 608, method 600 enters VCC buck mode and begins switching the buck transistor on and off (e.g., activated and deactivated) to buck electric machine voltage to near battery voltage.

The boost transistor is also commanded off each time the buck transistor is commanded on or activated. The buck transistor is switched at a predetermined frequency that is based on VVC hardware (e.g., the VVC inductor). Method 600 proceeds to 612.

At 612, method 600 determines the VVC duty cycle and limits the VVC duty cycle so that the dead time is provided between deactivating the boost transistor and activating the buck transistor or deactivating the buck transistor and activating the boost transistor. In one example, the VVC duty cycle is determined via equation 4. Further, the value of VVC_duty may be held to a value less than a threshold MaxVVCDuty. The value of MaxVVCDuty may be a predetermined amount smaller than the value of Max_duty_cycle. For example, if Max_duty_cycle is 0.9 then, MaxVVCDuty may be 0.88. The threshold MaxVVCDuty ensures that the maximum duty cycle of the signal applied to the buck transistor base does not exceed Max_duty_cycle. Method 600 applies a signal with a duty cycle equal to the limited value of VVC duty to the buck transistor to control the buck voltage at node 103 of FIG. 1. Further, the VVC and/or inverter applies the buck voltage at node 103 of FIG. 1 to the battery. Method 500 proceeds to exit.

At 610, method 600 judges if the target voltage (Target_V) is less than battery voltage (Vbatt) minus a threshold voltage (e.g., 10 volts). The threshold voltage provides hysteresis between a battery voltage at which electric machine voltage is bucked and provided to the electric energy storage device and electric machine voltage where that is not bucked and provided to the electric energy storage device. If method 600 judges that the target voltage (Target_V) is less than battery voltage minus the threshold voltage, the answer is yes and method 600 proceeds to 614. Otherwise, the answer is no and method 600 proceeds to 612.

At 614, method 600 exits buck mode and ceases sending a switching signal to the buck transistor. However, electric machine output voltage may continue to be supplied to the electric energy storage device as long as the sign of the electric machine torque request amount is negative. Method 600 proceeds to exit.

Thus, method 600 may transition between a buck mode where electric machine output voltage is decreased via a buck circuit and supplied to an electric energy storage device and a mode where electric machine output voltage is supplied to the electric energy storage device without reducing the voltage. Further, when the electric machine voltage is reduced, it may be reduced responsive to the battery voltage.

The methods of FIGS. 5 and 6 provide for a variable voltage control inverter operating method, comprising: receiving data to a controller; and switching a transistor of the variable voltage control inverter at a duty cycle via the controller in response to a desired output voltage of the variable voltage control inverter not being less than a battery voltage, the duty cycle adjusted responsive to the battery voltage. The method includes where the transistor is a boost transistor, and further comprising: adjusting the duty cycle in further response to a dead time between the boost transistor being deactivated and a buck transistor being activated. The method further comprises ceasing to switch the transistor via the controller in response to the desired output voltage being less than the battery voltage minus a threshold voltage. The method includes where the threshold voltage is a hysteresis voltage that prevents ceasing switching the transistor when the desired output voltage decreases. The method further comprises switching the transistor at a predetermined frequency (e.g., 10 kHz), and where the transistor is a boost transistor. The method includes where the desired output voltage is a DC voltage. The method further comprises converting the DC voltage to an AC voltage. The method further comprises supplying the AC voltage to an electric machine propelling a vehicle.

The methods of FIGS. 5 and 6 also provide for a variable voltage control inverter operating method, comprising: receiving data to a controller; switching a transistor of the variable voltage control inverter at a duty cycle via the controller in response to a desired output voltage of the variable voltage control inverter being less than a battery voltage and the desired output voltage of the variable voltage control inverter being greater than the battery voltage minus a threshold voltage, the duty cycle adjusted responsive to the battery voltage. The method further comprises applying an output voltage of the variable voltage control inverter to an electric machine. The method further comprises not switching the transistor via the controller in response to the desired output voltage being less than the battery voltage minus the threshold voltage. The method includes where the transistor is a boost transistor, and further comprising: adjusting the duty cycle in further response to a dead time between the boost transistor being deactivated and a buck transistor being activated. The method includes where the boost transistor is commanded on at a substantially same time as the buck transistor is commanded off. The method further comprises ceasing to switch the transistor via the controller in response to the desired output voltage being less than the battery voltage minus a threshold voltage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A variable voltage controller operating method, comprising:
   adjusting a commanded output voltage of a variable voltage controller boost circuit according to a ratio of a battery voltage to a duty cycle via a controller, where adjusting the commanded output voltage of the variable voltage controller boost circuit according to the ratio of the battery voltage to the duty cycle via the controller is performed in response to the ratio of the battery voltage to the duty cycle being greater than a target voltage;
   switching a transistor of the variable voltage controller boost circuit via the controller according to the commanded output voltage of the variable voltage controller boost circuit; and
   adjusting the commanded output voltage responsive to the target voltage in response to the ratio of the battery voltage to the duty cycle being less than the target voltage, the target voltage based on an electric machine torque request and speed of an electric machine, and switching the transistor at a predetermined frequency, and where the transistor is a boost transistor.

2. The method of claim 1, where the transistor is the boost transistor, where the duty cycle is generated via a dead time multiplied by two being subtracted from a switching period to produce a result and dividing the result by the switching period.

3. The method of claim 2, further comprising ceasing to switch the transistor via the controller in response to a desired output voltage of the variable voltage controller boost circuit being less than the battery voltage minus a threshold voltage.

4. The method of claim 3, where the threshold voltage is a hysteresis voltage that prevents ceasing switching the transistor when the desired output voltage of the variable voltage controller boost circuit decreases.

5. A variable voltage controller operating method, comprising: adjusting a commanded output voltage of a variable voltage controller boost circuit according to a ratio of a battery voltage to a duty cycle via a controller, where the commanded output voltage of the variable voltage controller boost circuit is a DC voltage; and switching a transistor of the variable voltage controller boost circuit via the controller according to the commanded output voltage of the variable voltage controller boost circuit; generating a desired output voltage of the variable voltage controller boost circuit via an electric machine torque request and an electric machine speed; and adjusting the commanded output voltage of the variable voltage controller boost circuit according to the ratio of the battery voltage to the duty cycle when the desired output voltage of the variable voltage controller boost circuit is less than the ratio of the battery voltage to the duty cycle; and adjusting the commanded output voltage of the variable voltage controller boost circuit according to the desired output voltage when the desired output voltage of the variable voltage controller boost circuit is greater than the ratio of the battery voltage to the duty cycle.

6. The method of claim 5, further comprising converting the DC voltage to an AC voltage.

7. The method of claim 6, further comprising supplying the AC voltage to an electric machine propelling a vehicle.

8. A system, comprising:
a variable voltage control inverter including a boost transistor, a buck transistor, and a controller, the controller including executable instructions stored in non-transitory memory to adjust a commanded output voltage of a variable voltage controller boost circuit according to a ratio of a battery voltage to a duty cycle via the controller and adjust the duty cycle applied to the boost transistor or the buck transistor via the controller in response to the commanded output voltage of the variable voltage control inverter, the controller including additional executable instructions to switch the boost transistor at the duty cycle via the controller in response to a desired output voltage of the variable voltage control inverter being less than the battery voltage and the desired output voltage of the variable voltage control inverter being greater than the battery voltage minus a threshold voltage, and the controller including additional executable instructions to adjust the commanded output voltage responsive to the target voltage in response to the ratio of the battery voltage to the duty cycle being less than the target voltage, the target voltage based on an electric machine torque request and speed of an electric machine, and wherein the desired output voltage of the variable voltage controller boost circuit is a voltage at a collector of the boost transistor, and where adjusting the commanded output voltage of the variable voltage controller boost circuit according to the ratio of the battery voltage to the duty cycle via the controller is performed in response to the ratio of the battery voltage to the duty cycle being greater than a target voltage.

9. The system of claim 8, further comprising a battery electrically coupled to the variable voltage control inverter and an electric machine electrically coupled to the variable voltage control inverter and additional instructions to generate the duty cycle via a dead time multiplied by two being subtracted from a switching period to generate a result and dividing the result by the switching period.

10. The system of claim 8, further comprising additional instructions to adjust the duty cycle in further response to a dead time between the boost transistor being deactivated and the buck transistor being activated.

11. The system of claim 8, further comprising additional instructions to command the buck transistor to activate and the boost transistor to deactivate at a substantially same time.

* * * * *